United States Patent [19]

Sorensen

[11] 4,231,609
[45] Nov. 4, 1980

[54] VEHICLE SUNROOF FRAME

[75] Inventor: Norman L. Sorensen, Detroit, Mich.

[73] Assignee: Wisco Corporation, Ferndale, Mich.

[21] Appl. No.: 965,172

[22] Filed: Nov. 30, 1978

[51] Int. Cl.$^3$ .............................................. B60J 7/18
[52] U.S. Cl. ..................................... 296/218; 49/465; 292/DIG. 5; 296/224
[58] Field of Search ....................... 296/137 B, 137 R; 49/465; 292/DIG. 5

[56] References Cited

U.S. PATENT DOCUMENTS

| | | | |
|---|---|---|---|
| 2,215,022 | 9/1940 | Votypka | 296/137 B |
| 3,537,212 | 11/1970 | Gilles | 49/381 |
| 3,913,971 | 10/1975 | Green | 296/137 B |
| 3,955,848 | 5/1976 | Lutz | 296/137 B |
| 4,154,474 | 5/1979 | Hough et al. | 296/137 B |

FOREIGN PATENT DOCUMENTS

V 7038 1/1956 Fed. Rep. of Germany ...... 296/137 R

Primary Examiner—Robert R. Song
Attorney, Agent, or Firm—Basile, Weintraub & Hanlon

[57] ABSTRACT

A frame and trim ring for a removable sunroof panel is disclosed. The frame is of one piece construction and is configured to cooperate with forward edge releasing bayonets which support the forward edge of the removable panel and a rear edge support for the panel comprising a two piece releasable latch assembly. The two-part rear edge fastener moves the rear edge of the panel from its closed position where it is sealed to the frame to a vented position wherein the rear edge of the panel is positioned above the frame to create an opening. A pivoting link in the two-part fastener is separated from a releasable latch attached to the frame to separate the rear edge of the panel from the frame. When the pivoting link has been released and the bayonets at the forward edge of the panel are released, the panel can be removed from the vehicle.

7 Claims, 17 Drawing Figures

VEHICLE SUNROOF FRAME

BACKGROUND OF THE INVENTION

Field of the Invention

This invention relates to the field of frames for removable sunroof panels for vehicles and more particular to a one piece frame to finish the opening in the roof of the vehicle and to cooperate with releasably bayonets to support the front edge of the panel and a two-part releasable latch to support the rear edge of the panel. A trim ring is used to attach the frame to the vehicle roof.

Cross Reference to Related Applications

This application relates to improvements in the sunroof arrangement disclosed in pending application Ser. No. 583,260 filed June 3, 1975, entitled "Detachable Sunroof Panel for Automobiles". Other related applications include application Ser. No. 950,030 filed Oct. 10, 1978 entitled "Sunroof Opening and Locking Device" and application Ser. No. 949,820 filed Oct. 10, 1978 entitled "Sunroof Forward Edge Latch".

Prior Art

The first referenced application discloses an opening in a vehicle roof adapted to receive a removable transparent sunroof panel. The panel is retained in the frame opening by a pair of bayonets which project from the underside of the panel on the forward edge and cooperate with the adjacent panel edge to engage the frame element. A two-part fastener for the rear edge of the panel includes a handle pivotally connected to the underside of the panel and a tongue pivotally connected to the handle and adapted to be retained in a lock member in the frame. The handle acts as an overcenter linkage to bend the panel against its curvature, forcing its perimeter into engagement with the frame or it may be extended to maintain the panel with its rear edge tilted away from the opening.

Other sunroof structures as disclosed in U.S. Pat. No. 2,215,022 employ panels supported for a sliding motion between a closed position, covering an opening in the vehicle roof, and an open position in which they are supported in a compartment affixed to the underside of the vehicle roof behind the opening.

Other examples of sunroof structures are disclosed in U.S. Pat. Nos. 3,913,971; 3,955,848; and 3,537,212; and West German Patentenmeldung No. V7038V/68B. These patents are relevant in that they are cited in the aforementioned application.

Prior Art Statement

The prior art listed hereinabove includes in the opinion of the Applicant the closest art of which the applicant is aware.

SUMMARY OF THE INVENTION

The present invention is broadly directed toward an improved frame to finish the opening in a vehicle roof and support a removable sunroof panel. A trim ring is complementary in form to the frame and attached thereto by a plurality of threaded fasteners to finish the bottom surface of the vehicle opening and provide a means for clamping the frame to the vehicle roof.

The rear edge of the removable panel is supported by a two-part fastener which separably joins the rear edge of the panel to the rear edge of the frame. The two-part fastener includes a releasable latch member affixed to the underside of the frame. The arm for the fastener pivots about a longitudinal axis and is pivotally connected to a hinge which is supported on the underside of the rear edge of the panel. A pivoting link is adapted to be pivotally and releasably retained at one end in a releasable latch member. The other end of the pivoting link is pivotally attached to the arm. The arm, the hinge, and the link form a three-element linkage which may be disposed in either an overcenter closed position wherein the arm lies adjacent to the underside of the panel and pulls the panel down against the frame, or in an overcenter extended position wherein the arm projects upwardly from the frame and supports the rear end of the panel above the frame so that the panel is inclined with respect to the frame in a ventilating position.

A releasably bayonet member releasably attaches the forward edge of the panel to the forward edge of the frame. In the latched position the forward edge of the panel squeezes the resilient molding between the lower surface of the panel and a horizontal section of the frame. In the latched position the releasing bayonet, the molding, and the lower surface of the forward edge of the panel cooperate to form a pivot point about which the panel can pivot so that the rear edge of the panel can be raised to an open position. To remove the panel from the frame the two-part fastener is rotated to move the rear edge of the panel to the raised or vented position, and a latch slide of the releasable latch assembly is moved to the released position, and the pivoting link is released to separate the rear edge of the panel from the frame. When the rear edge of the panel has been released from the frame, the releasing bayonets at the forward edge of the panel are released and the panel can be moved rearward a distance and removed from the frame.

It is therefore an object of the present invention to provide a new and improved sunroof structure having an improved one piece frame and a bottom trim ring adapted to secure the frame to the roof of the vehicle and finish the vehicle opening.

Other objects, advantages, and applications of the present invention will become apparent to those skilled in the art of sunroof structures when the accompanying description of one example of the best mode for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
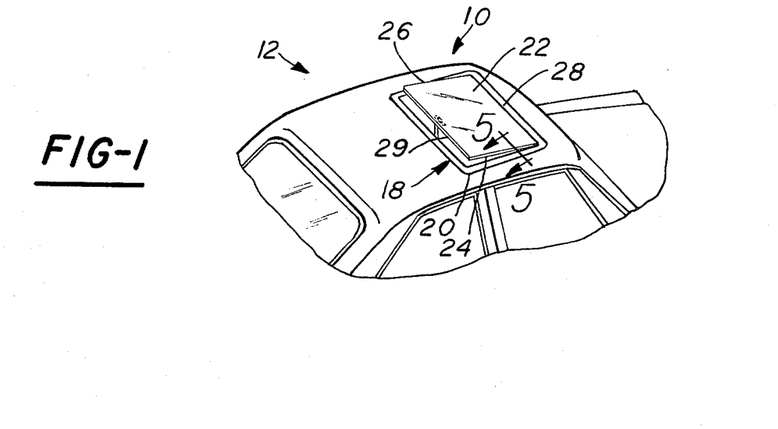
FIG. 1 is a fragmentary, perspective view of an automotive vehicle incorporating a sunroof formed in accordance with the principles of the present invention, with the panel shown in a tilted ventilating position.
Figure 2:
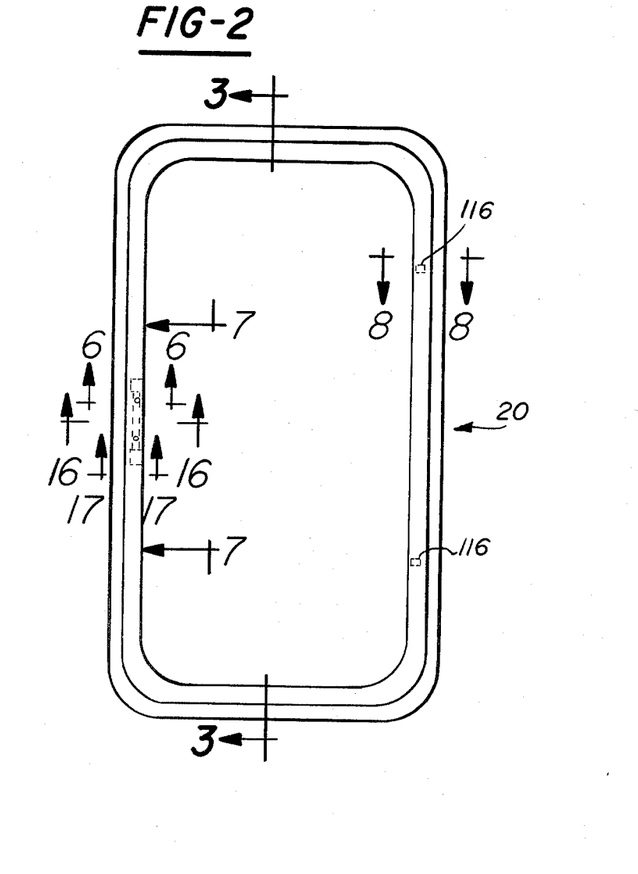
FIG. 2 is a top plan view of the frame of the present invention.
Figure 3:
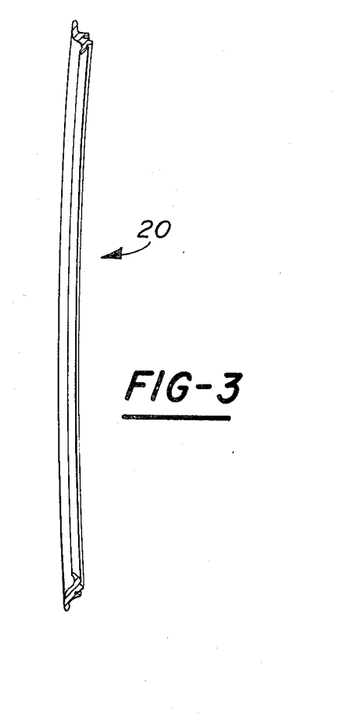
FIG. 3 is a sectional view of the front edge of the panel as viewed from the front of the vehicle along line 3—3 in FIG. 2.

Referring now to the drawings and in particular to FIG. 1 for one example of the present invention in the form of a sunroof 10 carried by an automobile 12 although it is equally applicable to trucks, vans, recreation vehicles, and the like.

Figures 4, 5, 6, 9:
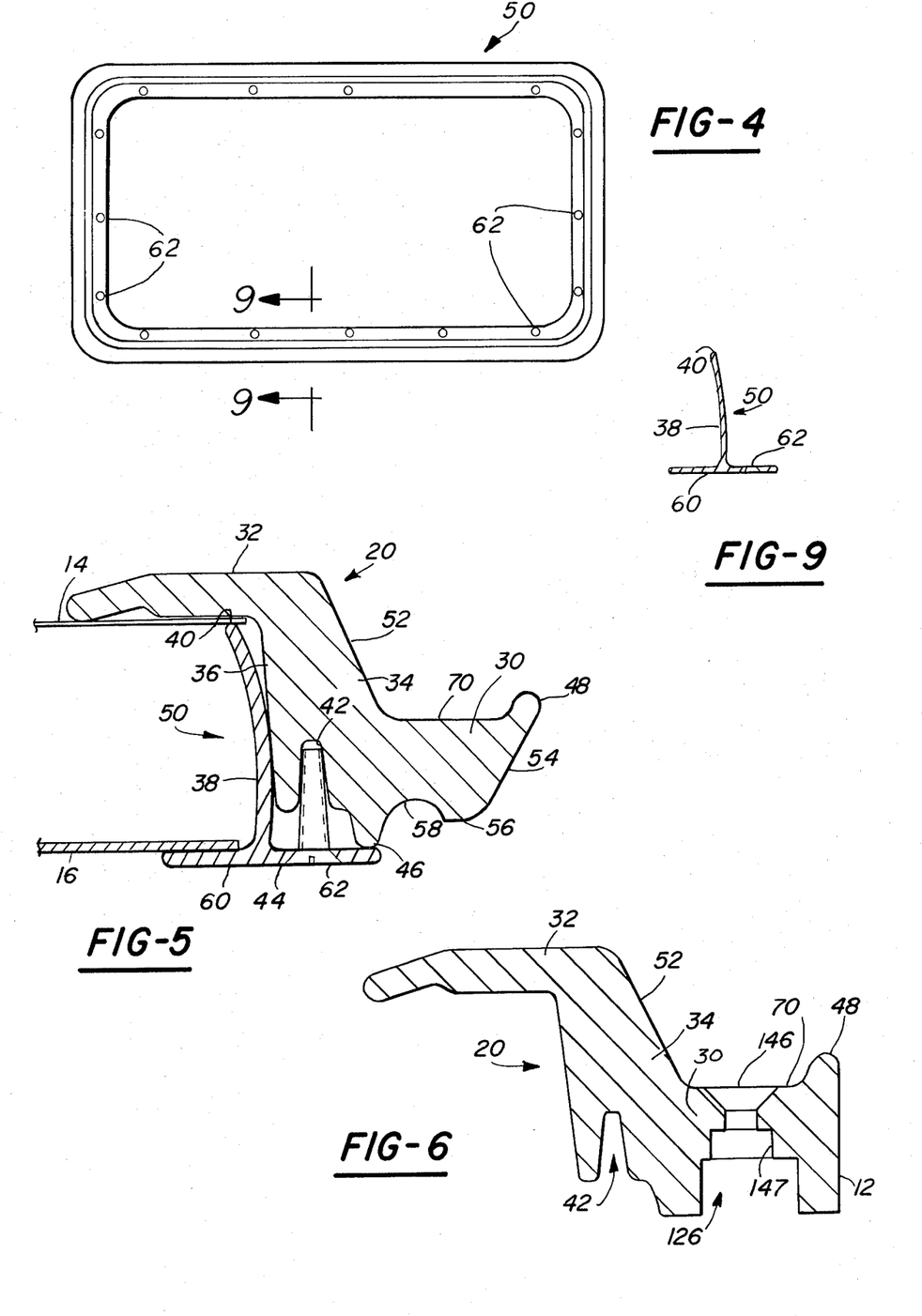
FIG. 4 is a top plan view of the trim ring as viewed from the top of the vehicle.
FIG. 5 is a typical cross sectional view of the edge of the frame sectioned along the line 5—5 in FIG. 1.
FIG. 6 is a cross sectional view of the rear edge of the frame taken along the line 6—6 in FIG. 2.
FIG. 9 is a cross sectional view of the trim ring taken along the line 9—9 in FIG. 4.

The roof of the automobile 12 is typically formed from an outer sheet metal skin 14, and a headliner 16, as shown in FIG. 5, is disposed under the roof sheet skin 14 and spaced inwardly therefrom. In accordance with the present invention, a sunroof opening 18 is formed in the roof, usually over the front seat of the vehicle, and the perimeter of the opening is finished with a frame member 20. The frame 20 is adapted to removally secure a panel 22, preferably formed from a sheet of shatterproof, tempered, tinted glass and having dimensions complementary to the opening 18.

The panel 22 is formed with a gradual curvature across its width so that its concave side faces upward away from the frame. Accordingly, two side edges 24 and 26 are straight, the forward edge 28 and the rear edge 29 are curved away from the frame 20. The frame 20 has a slight crown but when installed its curvature is less than that of the panel 22 so that when the forward edge 28 is first lowered into position against the frame 20, the panels, two side edges 24 and 26 abut the side edges of the frame 20 and the center of the rear edge 29 is slightly raised with respect to the frame 20. In the preferred embodiment of the invention the curvatures of the panel 22 and the frame 20 when installed are such that the center of the rear edge 29 of the panel 22 is separated from the frame 20 by about 3/8 of an inch in this position.

The frame 20 is formed from a single piece of injection molded, reinforced plastic. The frame 20 includes a horizontally extending section 32 (FIG. 5) which overlies the top of the roof sheet skin 14 at the opening 18. A downwardly extending section 34 of the frame 20 has a surface 36 inclined inwardly under the extending section 32 to form a surface adapted to abut with a vertical flange 38 of a trim ring 50 which has a top edge 40 abutting the underside of the perimeter of the roof sheet skin 14 to lock the frame 20 to the roof sheet skin 14. A vertical slot 42 is spaced in from the lower edge of the outside surface 36. The vertical slot 42 extends around the periphery of the frame 20 and is configured to receive a plurality of self-tapping screws 44. A downward projecting lip 46 is spaced inward from the vertical slot 42 and extends around the periphery of the sunroof frame 20. The downward extending section 34 has an inside surface 52 which extends downward and angles inward where it joins the horizontal section 30. The inside edge of the horizontal section 30 has an upward projecting lip 48 which extends around the periphery of the frame 20. The inside edge of the upward projecting lip 48 blends with an inner surface 54 of the horizontal section 30. The inner surface 54 projects downward and outward at an angle where it meets a lower surface 56 of the horizontal section 30. A concave depression is disposed between the inside edge of the downward projecting lip 46 and the corner where the inner surface 54 joins the lower surface 56 of the horizontal section 30 to form a cam recess 58. The cam recess 58 extends around the periphery of the frame except when it is been interrupted as will be described more fully hereinbelow.

The trim ring 50 has a shape complementary to the dimensions of the sunroof frame 20. The trim ring 50 has a bottom flange 60 which extends around the periphery of the sunroof frame 20 at its lower surface. The inner edge of the bottom flange 60 begins at the inner edge of the downward projecting lip 46 and the flange extends outward from the opening, terminating vertically below the approximate center of the horizontal flange 32. The vertical flange 38 integrally formed with the bottom flange extends upwardly in an arcuate manner curving outward with its inner surface abutting the outside surface 36 of the downward extending section 34. The vertical flange 38 terminates at its top end 40 where the top end 40 abuts the inside surface of the vehicle roof skin 14. A plurality of apertures 62 configured to receive the self-tapping screws 44 in a recessed manner are disposed around the periphery of the bottom flange 60 directly beneath the vertical slot 42. The self-tapping screws 44 engage the vertical slot 42 to secure the trim ring 50 to the sunroof frame 20. When the fasteners 44 have been securely fastened, the inner end of the flange 60 abuts the downward projecting lip 46, the vertical flange 38 abuts the outside surface 36 of the downward extending section 34, and the top end 40 of the vertical flange 38 abuts the inside surface of the roof skin 14, and the horizontal flange 32 carries the outside surface of the vehicle roof skin 14, holding the assembly firmly in position.

The horizontal section 30 of the frame 20 is cantilevered into the opening 18 spaced below and parallel to the plane of the roof. The upper surface 70 of the horizontal section 30 supports a resilient molding 64 at its upper surface.

Figure 10:
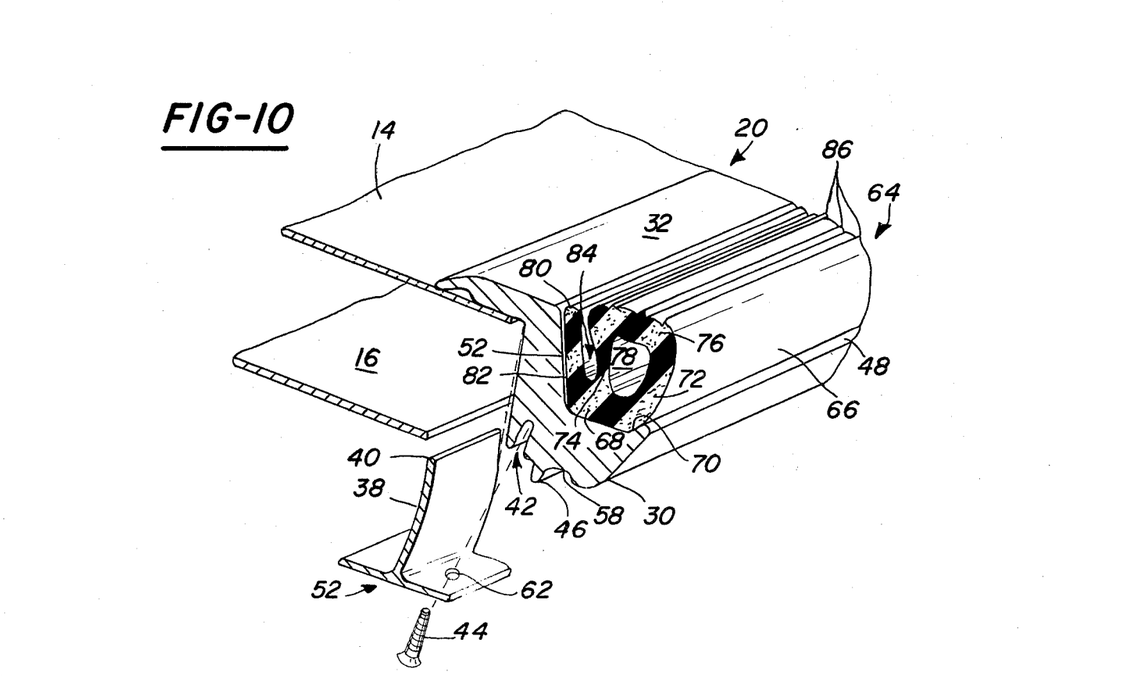
FIG. 10 is a partial perspective view of a typical section through the frame, vehicle roof and trim ring.

As can best be seen in FIG. 10, the resilient molding 64 comprises an elongated tubular section 66 having a base portion 68 which is seated on the upper surface 70 of the frame horizontal section 30. The tubular section 66 has upwardly and outwardly inclined integral side walls 72 and 74 which are joined at their upright extremities by top portion 76 to define therebetween an inner cavity 78. An upright flange 80 extends from the base 68 upwardly to approximately the same height as the tubular section 66. The outside surface 82 of the upright flange position 80 is seated on the inside surface 52 of the frame 20. The abutting surfaces of the molding 64 and frame 20 are secured to one another by any suitable means such as an adhesive. The opposing surfaces of the tubular section 66 and the upright flange portion 80 are laterally spaced from each other and define a longitudinal space 84, for a purpose to be described more fully hereinafter. The upper surface of the top portion 76 has a plurality of laterally spaced, longitudinally disposed ridges 86 which are adapted to receive and support the underside of the perimeter of the panel 22. When the panel 22 is in the closed position illustrated in FIG. 15 (as will be described hereinafter), the tubular section 66 is compressed; however, due to the longitudinal space 84 the constant expansion and compression of the tubular section 66 does not exert any forces onto the flange portion 80 and thus assures that the flange portion 80 will not prematurely separate from the inside surface 52 of the downward extending section 34. In the preferred embodiment the molding 64 is made of a closed cell neoprene sponge material.

Figure 15:
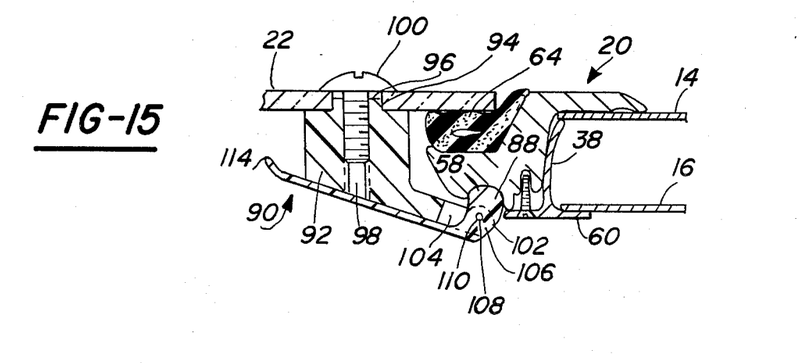
FIG. 15 is a cross sectional view through the releasing bayonet at the front edge of the panel.

As can best be seen in FIG. 15, at two spaced points along the forward edge of the opening 18 a pair of releasable latching bayonet members 90 are attached to the lower forward edge of the panel 22. The cam recess 58 along the lower surface of the frame 20 nestingly receives a cam projection 88 which will be more fully explained hereinbelow. The releasing bayonet body 92 has projecting from its surface a boss 94 which is slidingly received by an aperture 96 through the panel 22 near its forward edge. The boss 94 has at its center a threaded aperture 98 which threadingly receives a threaded fastener 100 which securely fastens the bayonet body 92 to the panel 22. The bayonet body projects toward the edge of the panel 22 at a slight downwardly inclined angle away from the panel. The forward edge of the bayonet 92 has an upwardly right angle bent, enlarged, extreme end section 102 which has an open pocket 104 extending rearward at its center to receive the pivoted end of a cam 106. The cam 106 has an aperture 108 through its pivoted end. A pair of aligned apertures (not shown) through the enlarged end section of the bayonet receives a spring pin 110 which is snugly received by the aligned apertures and slidingly passes through the aperture 108 forming a pivot for the cam 106. The cam projection 88 extends radially outward and upward from the aperture 108, extending above the enlarged end 102. The lower portion of the cam extends rearward a distance and then widens to equal the width of the bayonet body 92 forming an arm 114. The arm 114 of the cam extends rearward in a planar form conforming to the lower surface of the bayonet body 92 extending beyond the rear of the bayonet body 92 a distance. In its first or engaged position the arm 114 is against the bayonet body 92 and the projection 88 is extended upward abutting the cam recess 58, locking the front edge of the panel 22 in position by squeezing the panel 22 against the resilient molding 64. In its second or released position the arm 114 is pointed downward and the projection 88 is retracted into the pocket 104, releasing the squeeze on the resilient molding 64 to allow the panel to be withdrawn. The projection of the cam 88 is received by the cam recess 58 or is rotated to be disengaged from the cam recess 58, allowing the panel to be removed.

Figures 8, 14:
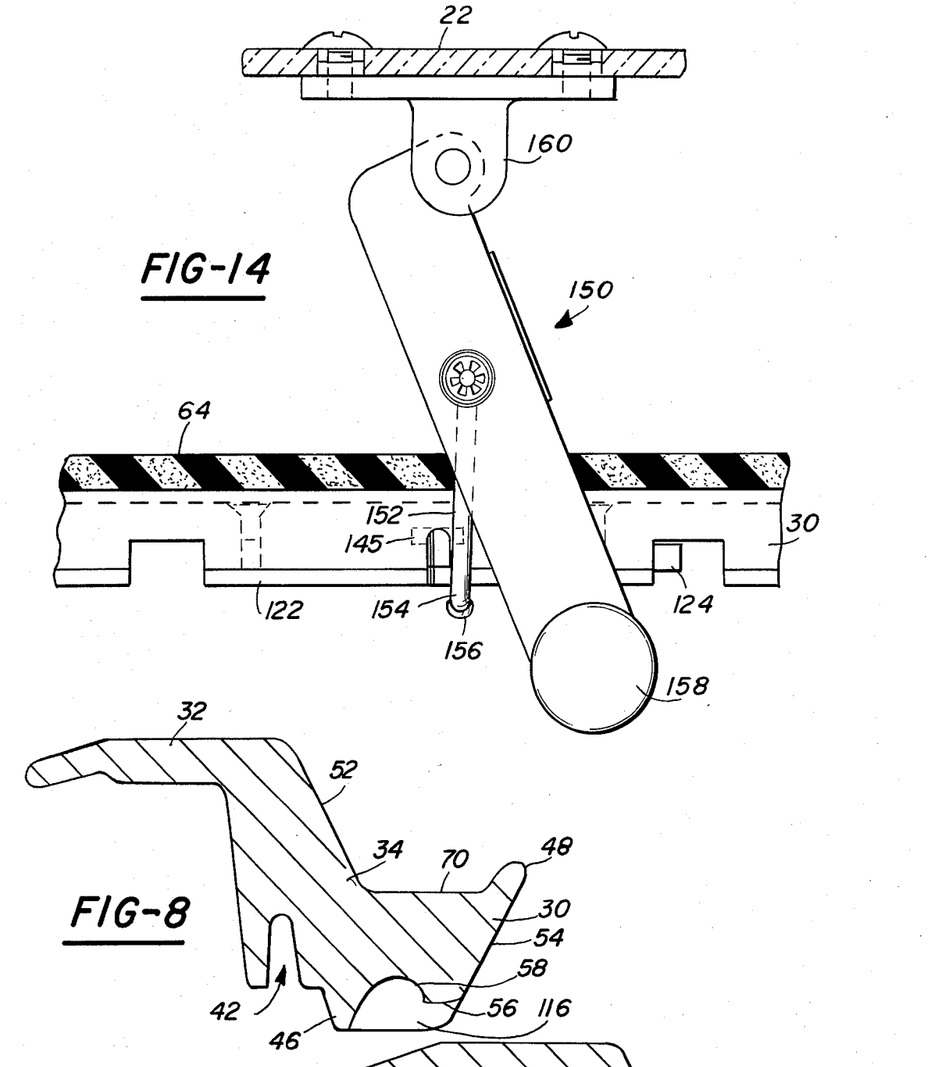
FIG. 8 is a cross sectional view through the front edge of the frame taken along the line 8—8 in FIG. 2.
FIG. 14 illustrates the two-part fastener in the released position with the latch slide moved to the released position releasing the rear edge of the panel from the frame.

At two points along the forward edge of the frame 20 the cam recess is filled in by a pair of alignment projections 116 (FIG. 8). The alignment projections 116 have a bottom wall which begins at the lower end of the downward projecting lip 46 and extends horizontally inward, filling the cam recess 58 and providing a projection below the lower surface 56. A bottom wall of the projection 116 extends inward and blends with a downward projection of the inner surface 54. The outer walls of the projections 116 facing away from the center of the vehicle abut the inner edges of the bayonet body 92 to prevent transverse movement of the panel 22 and to align the bayonets 92 in their proper position when the panel is being installed.

Figure 7:
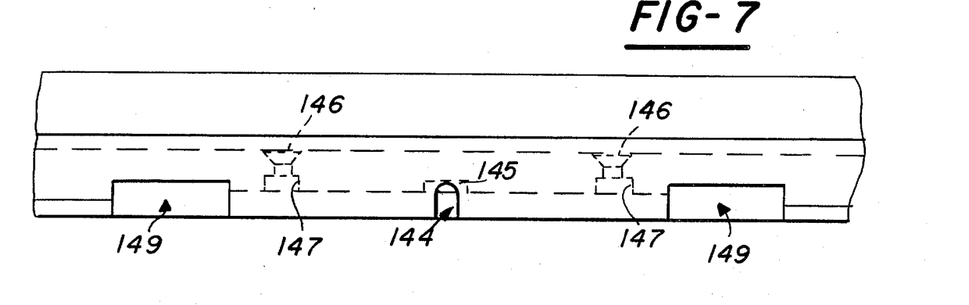
FIG. 7 is a view of the inside edge of the rear portion of the frame taken along the line 7—7 in FIG. 2.
Figure 11:
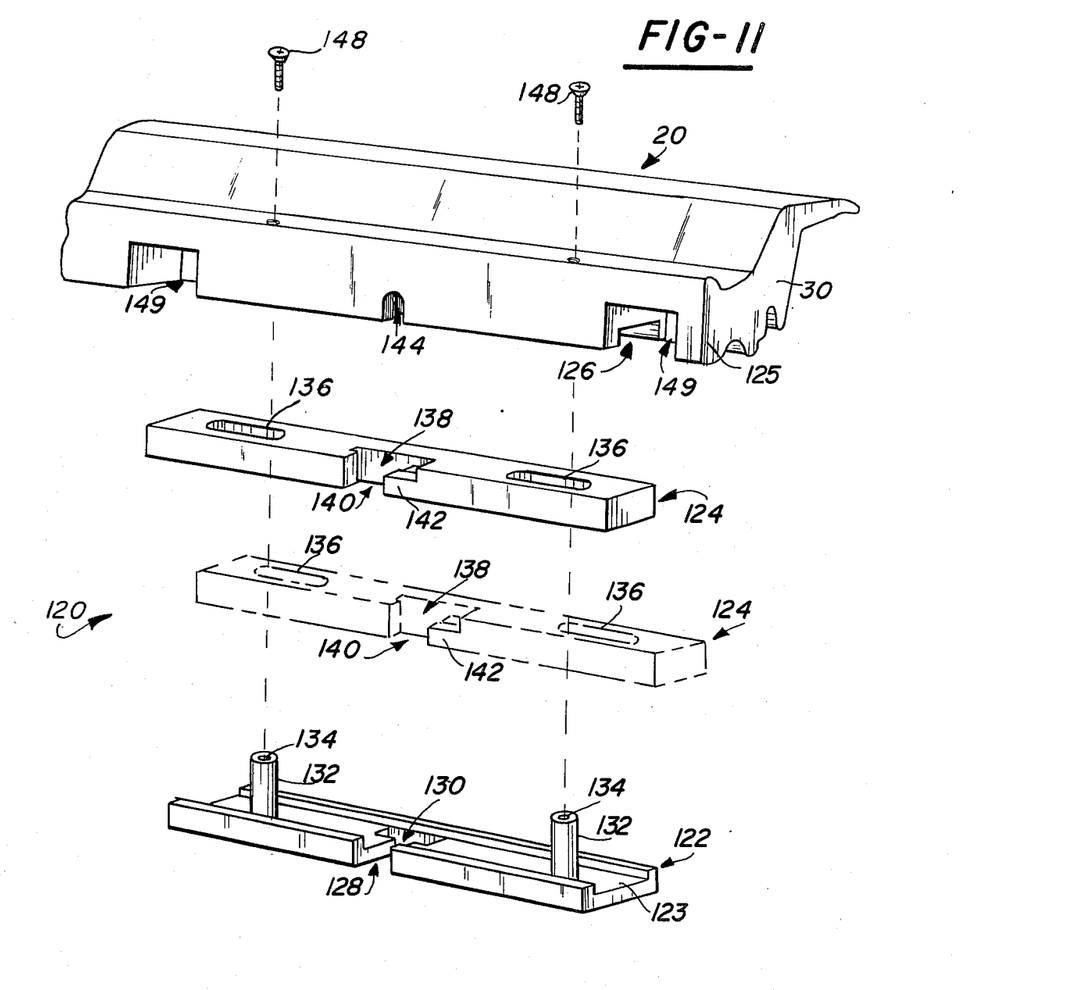
FIG. 11 is an exploded perspective view of the releasable latch assembly including the frame portion thereof.
Figure 16:
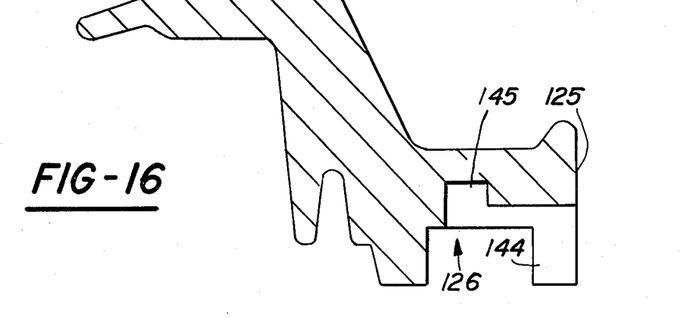
FIG. 16 is a cross sectional view through the rear edge of the frame along the line 16—16 in FIG. 2.
Figure 17:
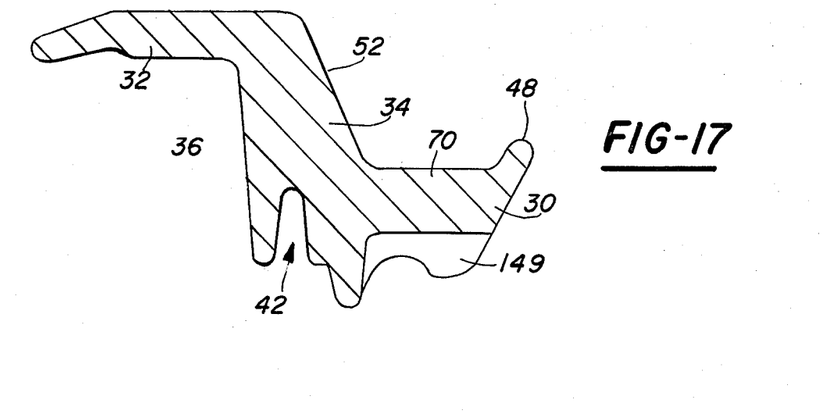
FIG. 17 is a cross sectional view through the rear edge of the frame along the line 17—17 in FIG. 2.

Referring now to FIG. 11 wherein there is illustrated an exploded perspective view of the releasable latch 120 comprising a base plate 122, a latch 124, and a transverse channel 126 in the lower surface of the rear of the frame 20. The base plate 122 has a horizontal recess 123 along its upper surfaces and has at its center a vertical slot 128 extended toward the interior where it widens out into a "T" shaped slot 130. Spaced in from the end of base plate is a pair of cylindrical projections 132 extending vertically upward a distance. Each projection 132 has disposed at its center a threaded aperture 134. The latch slide 124 has spaced in from its ends a pair of elongated apertures 136 configured to slidingly cooperate with the upright post 132. The elongated apertures 136 allow the latch slide to be moved from its first or released position to its second or latched position. A "T" shaped slot 138 at the center of the latch plate is configured to cooperate with the slots 128 and 130 in the base plate so that when the latch slide is in its first or released position, a slot 140 aligns with the slot 128 in the base plate 122, and in the second position or latched position a projection 142 forms a wall which extends inward toward the slot 140 a distance to project over the slot 128. An interior slot 144 is configured to not cover the slot 130 when the latch slide 124 is in either its first or second position. The projection 142 has its upper surface recessed below the upper surface of the latch slide 124 to provide clearance for the pivoting link when it is in position, as will be explained more fully hereinbelow. The transverse channel 126 in the frame has a depth and width to complement the horizontal recess 123 of the base plate 122 and slidingly receive the latch slide 124. The inner edge 125 of the frame 20 adjacent the channel is perpendicular to the roof to provide strength in that area. A vertical slot 144 is disposed in the center of the frame part way up its thickness with a radius at its top to communicate with the transverse channel 126 and receive a shank diameter of the other end of the pivoting link. A pocket 145 (FIG. 16) is disposed in the upper wall of the channel 126 communicating with the slot 144. The threaded apertures 134 in the base plate 122 align with a pair of apertures 146 (FIG. 7) in the horizontal section of the frame 20. A pair of enlarged bores 147 at the lower end of the apertures 46 receive the upper ends of the cylindrical projections 132. A pair of threaded fasteners 148 pass through the apertures in the horizontal section 30 to engage the threaded apertures 134 and secure the releasable latch to the horizontal section 30. A pair of access notches 149 at the ends of the channel 126 provide finger space to move the latch from a latched position to a released position.

When the latch slide 124 is in its released or first position, the enlarged end of the other end of the pivoting link is insertable into the releasable latch mechanism through the vertical slots 128, 140, 144, 130, and 138. When the pivoting link is in position, the latch slide 124 is slid to its latch position and the pivoting link is pivotally secured to the releasable latch mechanism with an enlarged end 156 of the link retained by the wall of the projection 142 and the pocket 145 (FIG. 14).

Figure 12:
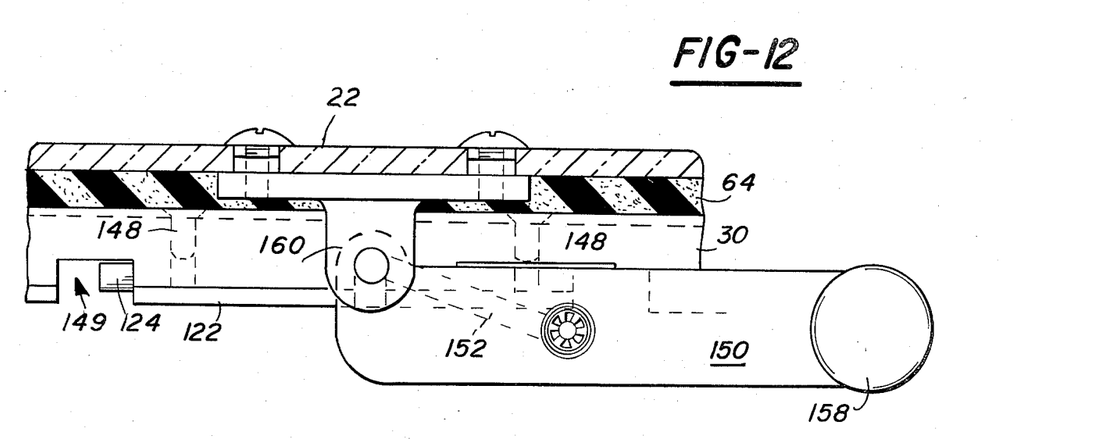
FIG. 12 is a view of the two-part fastener for releasably attaching the rear edge of the panel to the frame as viewed facing the rear of the vehicle with the two-part assembly in the closed position.
Figure 13:
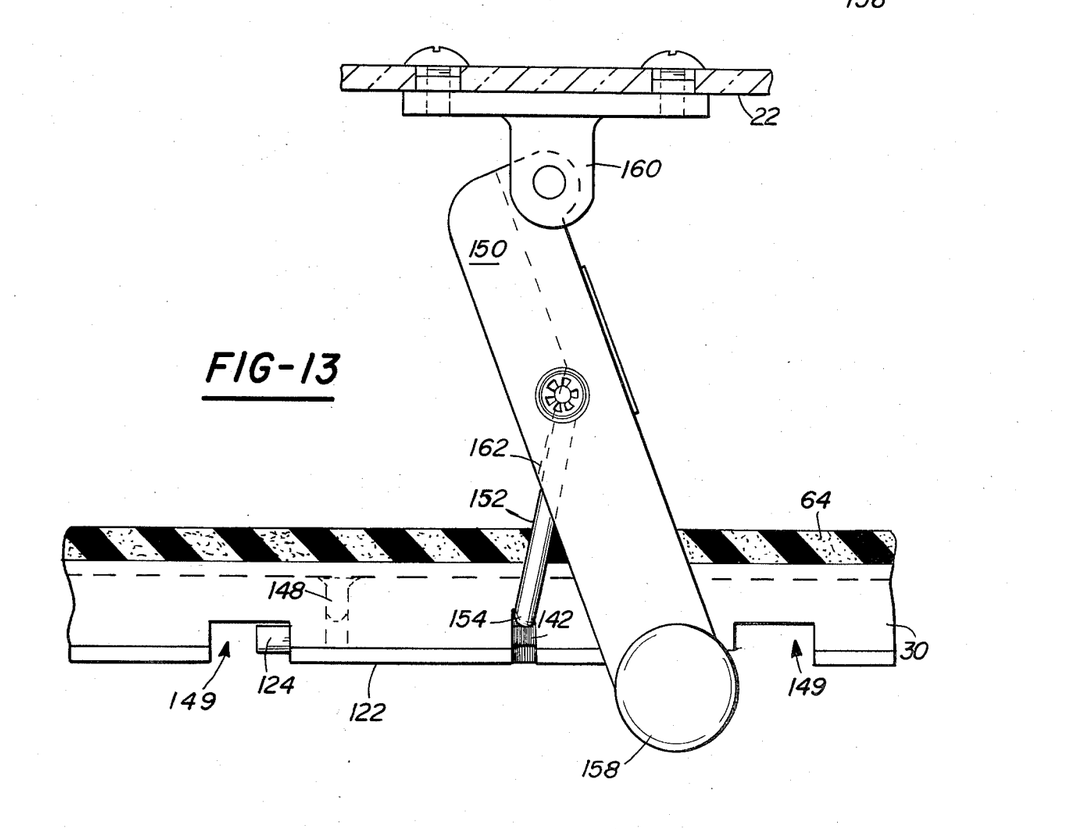
FIG. 13 is a view as in FIG. 12 with the two-part fastener in the vented position.

Referring now to FIG. 12 wherein there is illustrated the two-part fastener assembled with the arm 150 in the first or locked position. In this position a hinge 160 exerts a downward force on the panel 22 which squeezes the resilient molding 64 against the horizontal section 30 of the frame 20. The arm 150 and the pivoting link 152 are in an overcenter position holding the knob 158 in an upward position and the arm 150 in a horizontal configuration. In the arm's first or locked position, the latch slide 124 is pushed to the left locking the other end 154 of the pivoting link 152 into position. Referring now to FIG. 13 wherein the mechanism of the FIG. 12 has been extended to the second or vent position for the two-part fastener. To move the two-part fastener mechanism from the first or locked position to the second or vent position as shown in FIG. 13, the knob 158 is rotated clockwise to an approximate vertical position. Then the hinge 160 and the panel 22 are pushed upward with the arm 150 pivoting about the hinge 160 and the first end of the pivoting link 152 and the other end of the pivoting link 154 pivoting about their respective centers until the mechanism reaches an overcenter position. In the overcenter position the pivoting link 152 rests against a thickened portion 162 of the arm 150 to hold the panel 22 in the vented position.

To release the rear end of the panel 22 and remove the panel from the opening, the panel is first placed in the vented position as shown in FIG. 13. Then the latch slide 124 is slid to the right to its second or released position as shown in FIG. 14. The wall of the projection 142 is retracted when the latch slide 124 is moved to the right and the pivoting link 152 is pulled through the apertures 144, 140, 130, 138, and 128, releasing the other end 154 and the enlarged end 156 of the pivoting link. The arms 114 of the cams 106 are pushed downward at the forward end of the panel 22 to release the bayonet at the front end of the panel 22. The panel can then be displaced rearwardly a short distance and removed from the opening.

Having thus described my invention, what I claim is:

1. A frame extending around an opening in a vehicle roof to support a removable sunroof panel and finish the opening perimeter comprising:
   a horizontal flange cantilevered to the frame overlaying the vehicle top around the perimeter;
   a downward extending section with an inside surface inclined inwardly and an outside surface inclined inwardly;
   a horizontal section cantilevered into the opening spaced below the roof;
   a downward projecting lip integral with the bottom surface of the cantilevered section extending around the perimeter;
   means for nestingly receiving a pair of releasable latching bayonet cams;
   means for transversely aligning the bayonet cams;
   means for attaching a releasable latch assembly;
   a trim ring member having a lower horizontal flange abutting the lip extending around the frame perimeter for securing the frame to the vehicle roof and finishing the inside of the opening; and
   means for attaching the trim ring member to the frame.

2. A frame extending around an opening in a vehicle roof as defined in claim 1 wherein said means for nestingly receiving a pair of releasable latching bayonet cams comprises an arcuate cam recess located inwardly adjacent the downward projecting lip and extending around the perimeter of the lower surface of the frame.

3. A frame extending around an opening in a vehicle roof as defined in claim 1 wherein said means for transversely aligning bayonet cams comprises a pair of alignment projections integral with the frame projecting downward from the lower surface of the frame at its forward edge, spaced apart to have their outside edge abutting the inside edge of the latching bayonet.

4. A frame extending around an opening in a vehicle roof as defined in claim 1 wherein said means for attaching the trim ring member comprises a vertical recess around the perimeter of the frame extending upward a distance from the bottom surface, the recess located outward from the downward projecting lip, the width of the groove sized to threadingly receive a self-tapping threaded fastener.

5. A frame extending around an opening in a vehicle roof as defined in claim 1 wherein said means for attaching a releasable latch assembly comprises:
   a channel along the center portion of the rear edge extending up from the downward bottom surface, spaced in from the inside edge a distance, the inside edge of the frame adjacent the channel being perpendicular to the roof;
   a pair of access notches at the ends of the channel projecting rearward from the inside surface past an outside side of the channel extending up a distance beyond the channel upper wall and outward a distance from the channel ends;
   a third vertical slot with a radius at its top extending down the inside edge of the frame at the center of the channel, its sides extending to the bottom of the channel and some distance into the channel, configured to receive a shank diameter of a pivoting end, the inward end of the slot starting at an inside side of the channel, widening into a pocket terminating short of the outside side of the channel, a pair of spaced apart vertical apertures communicating with the channel spaced in from its end, the upper end of the apertures recessed to receive a threaded fastener, a lower end of the apertures where they communicate with the channel increasing in diameter aligned to slidingly receive a pair of cylindrical upright projections associated with the releasable latch assembly.

6. A frame extending around an opening in a vehicle roof as defined in claim 1 wherein said trim ring member comprises:
   a bottom flange having dimensions complementary to the frame disposed in a horizontal plane, having its inside edge covering the projecting lip and its outside edge projecting horizontally beyond the downward extending section a distance;
   a vertical flange spaced in from the outside edge extending vertically upward from the bottom flange, curving outward in an arcuate manner, abutting the outside surface of the downward extending section of the frame, terminating at an upper edge which squeezes the vehicle roof between the horizontal flange and the vertical flange; and
   a plurality of apertures in the bottom flange spaced around the perimeter aligned with the vertical recess, the apertures recessed to receive a plurality of self-tapping threaded fasteners.

7. A releasable latch in combination with a sunroof frame comprising:

a base plate with a first vertical slot at its center having a width to slidingly receive the shank diameter of a pivoting link, the slot widening longitudinally at the interior to receive an enlarged end of the pivoting link;

a longitudinal recess along the length of the base plate upper surface;

a pair of cylindrical upright projections integral with the base plate spaced in from the ends having at their center a threaded aperture;

a latch slide slidingly received by the recess having first and second positions and having a pair of elongated slots disposed longitudinally spaced in from the ends to slidingly receive the cylindrical projections and allow the latch slide to be slid longitudinally, a second vertical slot at its center aligned to allow the shank diameter of the pivoting link to pass through the first vertical slot and the second vertical slot when the slide is in its first position, when the slide is in its second position the vertical slot is not aligned with the first vertical slot, and a projecting wall of the slide covers the top of the vertical slot, the interior of the second vertical slot widens internally to clear the enlarged end of the pivoting link when the slide is in its first and second position, said slide having sufficient length to project from the appropriate end of the base plate when the slide is in its first and second position;

a transverse channel extending up from the bottom surface of the frame nestingly receiving the base plate and the latch slide, access notches in the frame to clear a projecting end of the latch slide and provide finger room, a pair of apertures through the horizontal section of the frame align with the pair of apertures in the upright projections, a pair of threaded fasteners pass through the vertical apertures to threadingly engage the threaded apertures in the base plate and assemble the releasable latch assembly, a pair of enlarged bores in the channel receive the upper end of the cylindrical upright projections, the third vertical slot is aligned with the first vertical slot, wherein when the latch slide is in its first position, the shank diameter and enlarged end of the pivoting link can be slidingly received by the first, second, and third vertical slots, and when the latch slide is moved to its second position, the wall of the slide latches the link to the releasable latch holding the link pivotally in place.

* * * * *